United States Patent
Segawa et al.

(10) Patent No.: US 8,947,448 B2
(45) Date of Patent: Feb. 3, 2015

(54) IMAGE PROCESSING DEVICE, IMAGE DATA GENERATION DEVICE, IMAGE PROCESSING METHOD, IMAGE DATA GENERATION METHOD, AND DATA STRUCTURE OF IMAGE FILE

(75) Inventors: Hiroyuki Segawa, Kanagawa (JP); Noriaki Shinoyama, Tokyo (JP); Akio Ohba, Kanagawa (JP); Tetsugo Inada, Kanagawa (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 311 days.

(21) Appl. No.: 13/517,097

(22) PCT Filed: Nov. 5, 2010

(86) PCT No.: PCT/JP2010/006512
§ 371 (c)(1),
(2), (4) Date: Aug. 17, 2012

(87) PCT Pub. No.: WO2011/077623
PCT Pub. Date: Jun. 30, 2011

(65) Prior Publication Data
US 2012/0313960 A1    Dec. 13, 2012

(30) Foreign Application Priority Data

Dec. 24, 2009  (JP) ................................ 2009-292939
Dec. 24, 2009  (JP) ................................ 2009-292940

(51) Int. Cl.
*G09G 5/00*    (2006.01)
*G09G 5/02*    (2006.01)
(Continued)

(52) U.S. Cl.
CPC .................. *G06T 15/10* (2013.01); *G06T 15/04* (2013.01)
USPC ........... 345/589; 345/581; 345/426; 345/584; 345/619; 345/505; 348/191; 348/210.99; 382/274; 382/285; 382/304; 382/305

(58) Field of Classification Search
USPC ......... 345/418–419, 422, 426, 428, 581, 589, 345/584, 618–619, 645, 501–505, 520, 545, 345/547, 549; 348/180, 189, 191, 194, 348/207.1, 208.13, 208.14, 210.99, 413.1; 358/504, 509, 518, 505; 382/253–254, 382/274, 285, 302–305
See application file for complete search history.

(56) References Cited

U.S. PATENT DOCUMENTS

| 4,994,989 A | 2/1991 | Usami |
| 5,852,671 A | 12/1998 | Oshima |

(Continued)

FOREIGN PATENT DOCUMENTS

| JP | 01205277 A | 8/1989 |
| JP | 8241436 A | 9/1996 |

(Continued)

OTHER PUBLICATIONS

Machine translation: JP 2007-226575.*

(Continued)

*Primary Examiner* — Wesner Sajous
(74) *Attorney, Agent, or Firm* — Matthew B. Dernier, Esq.; Gibson & Dernier LLP

(57) ABSTRACT

A parallax representation unit in a displayed image processing unit uses a height map containing information on a height of an object for each pixel to represent different views caused by the height of the object. A color representation unit uses, for example, texture coordinate values derived by the parallax representation unit to render the image, shifting the pixel defined in the color map. The color representation unit uses the normal map that maintains normals to the surface of the object for each pixel to change the way that light impinges on the surface and represent the roughness accordingly. A shadow representation unit uses a horizon map, which maintains information for each pixel to indicate whether a shadow is cast depending on the angle relative to the light source, so as to shadow the image rendered by the color representation unit.

21 Claims, 11 Drawing Sheets

(51) Int. Cl.
*G06T 15/40* (2011.01)
*H04N 3/02* (2006.01)
*H04N 9/04* (2006.01)
*G06K 9/40* (2006.01)
*G06K 9/36* (2006.01)
*G06K 9/54* (2006.01)
*G06T 15/10* (2011.01)
*G06T 15/04* (2011.01)

(56) References Cited

U.S. PATENT DOCUMENTS

| | | | | |
|---|---|---|---|---|
| 6,263,100 | B1* | 7/2001 | Oshino et al. | 382/154 |
| 6,556,201 | B1* | 4/2003 | Maehara et al. | 345/427 |
| 6,563,999 | B1 | 5/2003 | Suzuoki | |
| 6,774,898 | B1* | 8/2004 | Katayama et al. | 345/428 |
| 6,914,599 | B1* | 7/2005 | Rowe et al. | 345/420 |
| 7,436,405 | B2 | 10/2008 | Losasso Petterson | |
| 7,692,662 | B2 | 4/2010 | Ohba | |
| 2004/0207631 | A1 | 10/2004 | Fenney | |
| 2005/0253843 | A1 | 11/2005 | Losasso Petterson | |
| 2006/0050069 | A1* | 3/2006 | Okuno et al. | 345/419 |
| 2006/0109277 | A1 | 5/2006 | Fenney | |
| 2006/0146063 | A1* | 7/2006 | Ohba | 345/584 |
| 2006/0170681 | A1* | 8/2006 | Ohba | 345/426 |
| 2008/0232647 | A1* | 9/2008 | Yamauchi et al. | 382/108 |
| 2010/0007669 | A1* | 1/2010 | Bethune et al. | 345/520 |
| 2010/0085380 | A1* | 4/2010 | Tsuda | 345/629 |

FOREIGN PATENT DOCUMENTS

| | | | |
|---|---|---|---|
| JP | 0973555 A | 3/1997 | |
| JP | 10069543 A | 3/1998 | |
| JP | 2000207577 A | 7/2000 | |
| JP | 2001175888 A | 6/2001 | |
| JP | 2005275797 A | 10/2005 | |
| JP | 2005332395 A | 12/2005 | |
| JP | 2006127412 A | 5/2006 | |
| JP | 2006285510 A | 10/2006 | |
| JP | 2006523876 A | 10/2006 | |
| JP | 2007226575 A | * | 9/2007 |

OTHER PUBLICATIONS

Onoue, Koichi, Nelson Max, and Tomoyuki Nishita. "Real-Time rendering of bumpmap shadows taking account of surface curvature." Cyberworlds, 2004 International Conference on. IEEE, 2004.*

Sylvain Fefebvre, et. al., Unified Texture Management for Arbitrary Meshes, Repport de recherche, N5210, Institut National De Recherche En Informatique Et En Automatique, No. 5210, pp. 1-20, (May 2004).

Martin Kraus, et. al., Adaptive Texture Maps, Graphics Hardware, pp. 1-10, The Eurographics Association, (2002).

International Search Report and Written Opinion for the corresponding PCT Application No. PCT/JP2010/006512, dated Jan. 11, 2011.

International Preliminary Report on Patentability for the corresponding PCT Application No. PCT/JP2010/006512, dated Jun. 26, 2012 (See translation of ISR and Written Opinion for relevance).

Office Action for the corresponding Japanese Patent Application No. 2009-292939, dated Feb. 14, 2012.

Office Action for the corresponding Japanese Patent Application No. 2009-292939, dated May 22, 2012.

Koichi Onoue, Bumpmap Shadows on Curved Surfaces, IPSJ SIG Technical Reports, Japan, Information Processing Society of Japan, vol. 2007, No. 117, p. 63-68, Nov. 25, 2003 (see English abstract).

* cited by examiner

IMAGE PROCESSING DEVICE, IMAGE DATA GENERATION DEVICE, IMAGE PROCESSING METHOD, IMAGE DATA GENERATION METHOD, AND DATA STRUCTURE OF IMAGE FILE

TECHNICAL FIELD

The present invention relates to an image processing technology for changing a displayed image in association with the movement of a viewpoint.

BACKGROUND ART

Home entertainment systems are proposed capable of playing back moving images as well as running game programs. In home entertainment systems, a GPU generates three-dimensional images using polygons (see, for example, patent document No. 1).

Regardless of the purpose of image display, improvement in efficiency of displaying images is an important and constant challenge. High-speed rendering of high-definition images requires various efforts. For example, there is proposed a method of storing texture data separately to make the process of mapping efficient (e.g., non-patent document Nos. 1 and 2).

[patent document No. 1] U.S. Pat. No. 6,563,999

[non-patent document No. 1] Sylvain Fefebvre, et. al., Unified Texture Management for Arbitrary Meshes, Repport de recherche, N5210, May 2004, Institut National De Recherche En Informatique Et En Automatique

[non-patent document No. 2] Martin Kraus, et. al., Adaptive Texture Maps, Graphics Hardware (2002), pp 1-10, The Eurographics Association

DISCLOSURE OF THE INVENTION

Problem to be Solved by the Invention

For responsive display of high-definition images, reduction in data size and high-speed rendering are important and constant challenges. There is also called for a technology capable of giving viewers realistic sensation by using a high-definition image and changing a displayed image in association with different movements of a viewpoint.

SUMMARY OF THE INVENTION

The present invention addresses these challenges and a purpose thereof is to provide an image processing technology capable of displaying a high-definition image efficiently and in a manner that gives viewers a realistic sensation.

One embodiment of the present invention relates to an image processing device. The image processing device comprises: a storage unit configured to store a plurality of items of image data respectively used for a plurality of processes for rendering an image to be displayed; a rendered area identification unit configured to identify frame coordinates of an area that is located in the image to be displayed and that is to be newly displayed in response to a request input by a user to move a viewpoint; and a displayed image processing unit configured to render an area in a displayed image corresponding to the frame coordinates, by using the image data stored in the storage unit, and configured to output data for the rendered area to a display device, wherein the displayed image processing unit changes process to be performed among the plurality of processes that respectively use the plurality of items of image data, depending on the height of a viewpoint responsive to the request to move the viewpoint.

Another embodiment of the present invention relates to an image data generation device. An image data generation device is for generating data for an image capturing an object, and comprises: a measured image acquisition unit configured to acquire a plurality of measured images capturing the object in different directions of a light source; a color map creation unit configured to create a color map from one of the measured images captured when the light source is in a predefined direction, the color map containing color information for each pixel; a normal map creation unit configured to analyze the measured images according to the photometric stereo method and to create a normal map representing normal vectors of the object in association with each pixel contained within the image; a height map creation unit configured to create a height map representing the respective height of the object in association with each of the pixels, by scanning the entirety of the normal map in a predefined direction and by integrating the inclination of the object identified in the predefined direction by referring to the respective normal vectors; and a storage unit configured to store the color map, the normal map, and the height map as the image data.

Another embodiment of the present invention relates to an image processing method. The image processing method comprises: identifying frame coordinates of an area that is located in an image to be displayed and that is to be newly displayed in response to a request input by a user to move a viewpoint; reading at least one of a plurality of items of image data stored in a storage device and respectively used for a plurality of processes for rendering an image to be displayed, and using the read data to render an area in a displayed image corresponding to the frame coordinates; and outputting data for the rendered area to a display device, wherein the rendering comprises: changing process to be performed among the plurality of processes that respectively use the plurality of items of image data, depending on the height of a viewpoint responsive to the request to move the viewpoint.

Another embodiment of the present invention relates to an image data generation method. The image data generation method is for generating data for an image capturing an object, and comprises: acquiring a plurality of measured images capturing the object in different directions of a light source and storing the images in a memory; creating a color map from one of the measured images read from the memory and captured when the light source is in a predefined direction, the color map containing color information for each pixel; analyzing the measured image read from the memory according to the photometric stereo method and creating a normal map representing normal vectors of the object in association with each pixel contained within the image; creating a height map representing the respective height of the object in association with each of the pixels, by scanning the entirety of the normal map in a predefined direction and by integrating the inclination of the object identified in the predefined direction by referring to the respective normal vectors; and storing the color map, the normal map, and the height map in a storage device as the image data.

Another embodiment of the present invention relates to a data structure of an image file. The data structure is of an image file read from a storage device to display at least a part of an image on a display, the data structure mapping the following to each other: a color map used to represent a color in a displayed image and maintaining color information for each pixel; a height map used to represent parallax relative to an object in an image and maintaining, for each pixel, information on the height of the object, respectively, relative to an image plane; a normal map used to represent surface roughness of an object in an image and maintaining, for each pixel, information on a normal vector on the surface of the object; and a horizon map used to cast a shadow corresponding to a light source of a predefined direction and maintaining, for each pixel, information on a direction of a light source when a shadow of an object is cast on the pixel.

Another embodiment of the present invention relates to an image processing device. The image processing device comprises: a storage unit configured to store a plurality of items of image data respectively used for a plurality of processes for rendering an image to be displayed; a rendered area identification unit configured to identify frame coordinates of an area that is located in the image to be displayed and that is to be newly displayed in response to a request input by a user to move a viewpoint; and a displayed image processing unit configured to render an area in a displayed image corresponding to the frame coordinates, by using the image data stored in the storage unit, and configured to output data for the rendered area to a display device, wherein each of the plurality of items of image data has a hierarchical structure hierarchizing, in order of resolution, two-dimensional data corresponding to a plurality of image planes that are representations of a single image in different resolutions, and the displayed image processing unit switches the layer of image data used for rendering, depending on the height of a viewpoint responsive to the request to move the viewpoint.

Another embodiment of the present invention relates to an image data generation device. The image data generation device is for generating data for an image capturing an object, and comprises: a measured image acquisition unit configured to acquire a plurality of measured images capturing the object in different directions of a light source; a color map creation unit configured to create hierarchical data for a color map in which color maps containing color information for each pixel are hierarchized in order of resolution, from one of the measured images captured when the light source is in a predefined direction and from images of different resolutions generated by reducing said one of the measured images; a normal map creation unit configured to analyze the measured image according to the photometric stereo method and configured to create a normal map representing normal vectors of the object in association with each pixel in the image and corresponding to the resolution of said one of the measured images; and a height map creation unit configured to create a height map representing the height of the object, respectively, in association with each pixel by scanning the entirety of the normal map corresponding to the resolution of said one of the measured images in a predefined direction and by integrating the inclination of the object identified in the predefined direction by referring to the normal vector, and to generate hierarchical data for a height map in which a plurality of height maps of different resolutions generated by reducing the created height map in order of resolution, wherein, of the height maps of the respective layers in the hierarchical data for the height map, the normal map creation unit: scans the entirety of height maps of layers other than the layer corresponding to the resolution of said one of the measured images in a plurality of directions: differentiates a height of an object so as to acquire information on the inclination of the object in respective scan directions: and computes a synthesized normal vector produced by synthesizing, for each pixel, normal vectors identified in respective scan directions from the inclination, thereby creating hierarchical data for the normal map in which a plurality of normal maps of different resolutions are hierarchized in order of resolution.

Another embodiment of the present invention relates to an image processing method. The image processing method comprises: identifying frame coordinates of an area that is located in an image to be displayed and that is to be newly displayed in response to a request input by a user to move a viewpoint; reading at least one of a plurality of items of image data stored in a storage device and respectively used for a plurality of processes for rendering an image to be displayed, and using the read data to render an area in a displayed image corresponding to the frame coordinates; and outputting data for the rendered area to a display device, wherein each of the plurality of items of image data has a hierarchical structure hierarchizing, in order of resolution, two-dimensional data corresponding to a plurality of image planes that are representations of a single image in different resolutions, and the rendering switches the layer of image data used for rendering, depending on the height of a viewpoint responsive to the request to move the viewpoint.

Another embodiment of the present invention relates to an image data generation method. The image data generation method is for generating data for an image capturing an object, and comprises: acquiring a plurality of measured images capturing the object in different directions of a light source; creating hierarchical data for a color map in which color maps containing color information for each pixel are hierarchized, in order of resolution, from one of the measured images captured when the light source is in a predefined direction and from images of different resolutions generated by reducing said one of the measured images; analyzing the measured image according to the photometric stereo method and creating a normal map representing normal vectors of the object in association with each pixel in the image and corresponding to the resolution of said one of the measured images; creating a height map representing the height of the object, respectively, in association with each pixel by scanning the entirety of the normal map corresponding to the resolution of said one of the measured images in a predefined direction and by integrating the inclination of the object identified in the predefined direction by referring to the normal vector, and generating hierarchical data for a height map in which a plurality of height maps of different resolutions generated by reducing the created height map in order of resolution; and of the height maps of the respective layers in the hierarchical data for the height map, scanning the entirety of height maps of layers other than the layer corresponding to the resolution of said one of the measured images in a plurality of directions and then differentiating the height of the object so as to acquire information on an inclination of the object in respective scan directions, and computing a synthesized normal vector produced by synthesizing, for each pixel, normal vectors identified in respective scan directions from the inclination, thereby creating hierarchical data for the normal map in which a plurality of normal maps of different resolutions are hierarchized in order of resolution.

Another embodiment of the present invention relates to a data structure of an image file. The data structure is for an image file read from a storage device to display at least a part of an image on a display, wherein the data structure has a hierarchical structure in which two-dimensional data comprising a plurality of items of image data respectively used for a plurality of processes for rendering an image to be displayed and respectively corresponding to a plurality of image planes that represent a single image to be displayed in a plurality of resolutions are hierarchized, in order of resolution, and in which the plurality of items of image data are mapped to each other.

According to the embodiments of the present invention, images can be displayed efficiently and in a manner that gives viewers a realistic sensation.

DETAILED DESCRIPTION OF THE INVENTION

An embodiment of the present invention displays an image of an object with roughness in high definition and in a manner that gives viewers a realistic sensation. Taking an oil painting as an example, different painters use different brush touches (e.g., different ways of laying the paint). The difference is appreciated as a technique of representation. In an exhibition, for example, viewers enjoy paintings by bringing his or her face close to an artwork to see the touch, or moving away from it to see the whole composition. Roughness on the surface of oil paintings or other objects is an important element to represent their texture. Merely increasing the number of pixels to provide detailed color information cannot properly reproduce roughness of an object on a screen. The embodiment allows an image to be displayed in a manner that gives viewers a realistic sensation by representing shadows caused by the roughness on the surface, detailed specular reflection, and blocking of sight.

Figure 1:
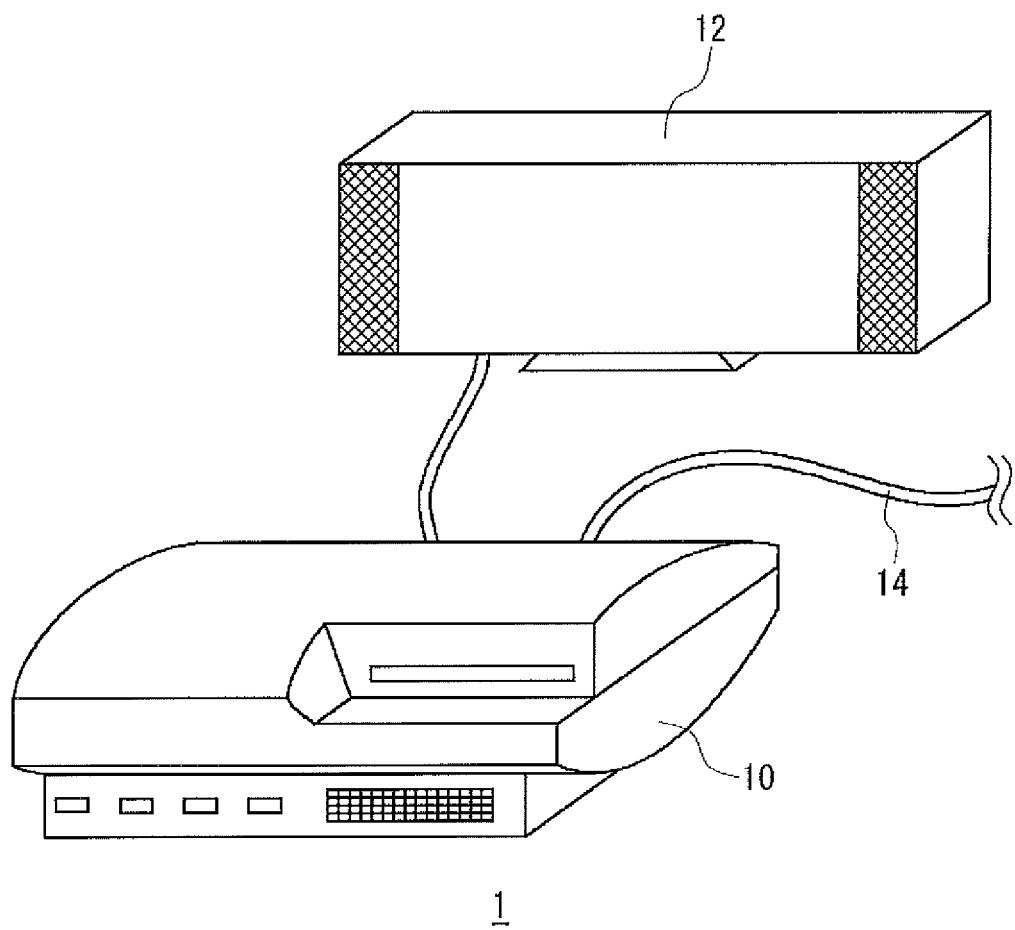
FIG. 1 shows an environment in which an image processing system according to an embodiment of the present invention is used.

FIG. 1 shows an environment in which an image processing system 1 according to an embodiment of the present invention is used. The image processing system 1 comprises an image processing device 10 configured to run an application program including that of image processing, and a display device 12 configured to output a result of processing by the image processing device 10. The display device 12 may be a television set provided with a display for outputting an image and a speaker for outputting sound.

The display device 12 may be connected to the image processing device 10 by cable or connected wirelessly using, for example, wireless LAN (Local Area Network). The image processing device 10 in the image processing system 1 may be connected to an external network such as the Internet by a cable 14 and download and acquire content, including hierarchized compressed image data. The image processing device 10 may be connected to an external network wirelessly.

The image processing device 10 changes a display area by enlarging/reducing an image displayed on the display of the display device 12 or moving the image upward, downward, leftward, or rightward, in accordance with a user request for movement of the viewpoint. When the user manipulates an input device by viewing an image displayed on the display, the input device transmits a signal requesting movement of a display area to the image processing device 10.

Figure 2:
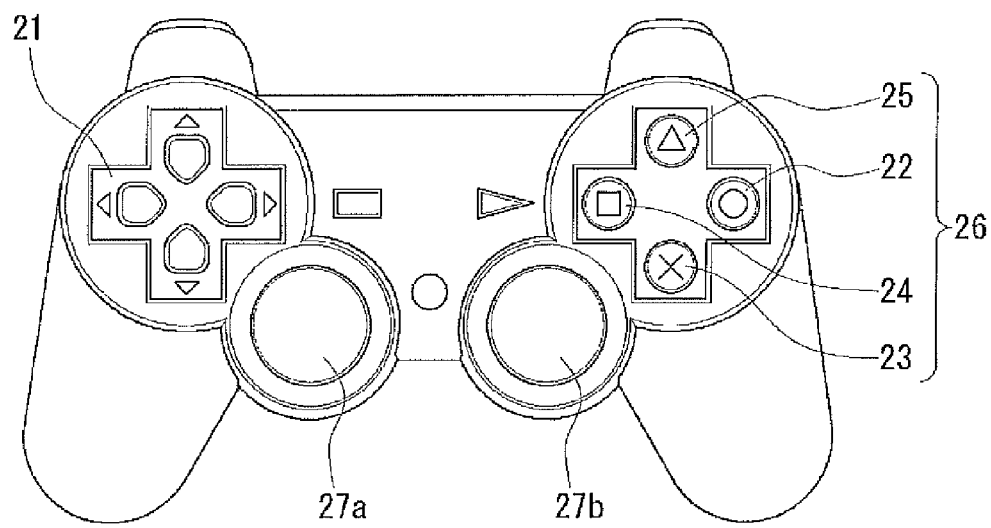
FIG. 2 shows the appearance of the input device that can be applied to the image processing system of FIG. 1.

FIG. 2 shows the appearance of the input device 20. The input device 20 is provided with directional keys 21, analog sticks 27a, 27b, and four control buttons 26, which are means for user control. The four control buttons 26 comprises a circle button 22, a cross button 23, a square button 24, and a triangle button 25.

The user control means of the input device 20 in the image processing system 1 is assigned the function of entering a request for changing the height of the viewpoint, i.e., a request for enlarging/reducing a displayed image, and entering a request for moving the viewpoint on a horizontal plane, i.e., a request for scrolling upward, downward, leftward, or rightward. For example, the function of entering a request for enlarging/reducing a displayed image may be allocated to the right analog stick 27b. The user can enter a request to reduce a displayed image by pulling the analog stick 27b toward the user and can enter a request to enlarge a displayed image by pushing it away from the user.

The function of entering a request for scrolling upward, downward, leftward, or rightward may be allocated to the directional keys 21. By pressing the directional keys 21, the user can enter a request for movement in the direction in which the directional keys 21 is pressed. The function of entering a request to change the viewpoint may be allocated to alternative user control means. For example, the function of entering a request for scrolling may be allocated to the analog stick 27a.

Figure 3:
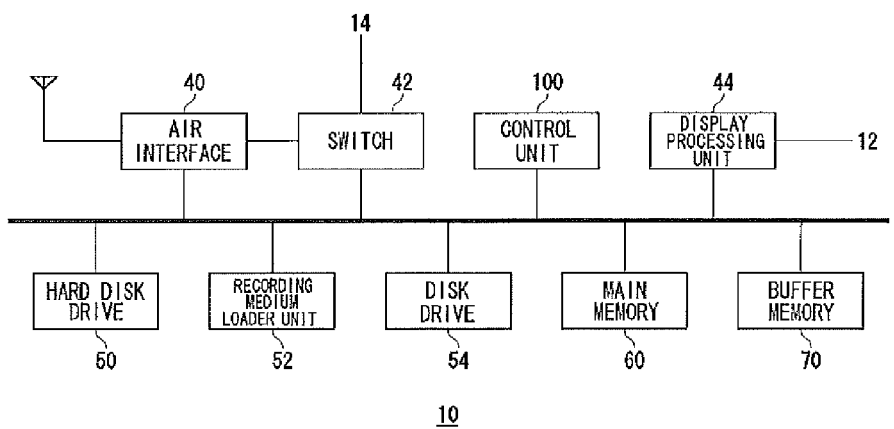
FIG. 3 shows the configuration of the image processing device according to the embodiment.

FIG. 3 shows the configuration of the image processing device 10. The image processing device 10 comprises an air interface 40, a switch 42, a display processing unit 44, a hard disk drive 50, a recording medium loader unit 52, a disk drive 54, a main memory 60, a buffer memory 70, and a control unit 100. The display processing unit 44 is provided with a frame memory for buffering data to be displayed on the display of the display device 12.

The switch 42 is an Ethernet switch (Ethernet is a registered trademark), a device connected to an external device by cable or wirelessly so as to transmit and receive data. The switch 42 is connected to an external network via the cable 14 so as to receive image data, etc. from a server. The switch 42 is connected to the air interface 40. The air interface 40 is connected to the input device 20 using a predefined wireless communication protocol. A signal input by the user via the input device 20 is supplied to the control unit 100 via the air interface 40 and the switch 42.

The hard disk drive 50 functions as a storage device for storing data. The image data received via the switch 42 is stored in the hard disk drive 50. When a removable recording medium such as a memory card is mounted, the recording medium loader unit 52 reads data from the removable recording medium. When a ROM disk is mounted, the disk drive 54 drives and recognizes the ROM disk so as to read data. The ROM disk may be an optical disk or a magneto-optical disk. The image data may be stored in the recording medium.

The control unit 100 is provided with a multicore CPU. One general-purpose processor core and a plurality of simple processor cores are provided in a single CPU. The general-purpose processor core is referred to as a power processing unit (PPU) and the other processor cores are referred to as synergistic-processing units (SPU).

The control unit 100 is provided with a memory controller connected to the main memory 60 and the buffer memory 70. The PPU is provided with a register and a main processor as an entity of execution. The PPU efficiently allocates tasks as basic units of processing in applications to the respective SPUs. The PPU itself may execute a task. The SPU is provided with a register, a subprocessor as an entity of execution, and a local memory as a local storage area. The local memory may be used as the buffer memory 70.

The main memory 60 and the buffer memory 70 are storage devices and are formed as random access memories (RAM). The SPU is provided with a dedicated direct memory access (DMA) controller and is capable of high-speed data transfer between the main memory 60 and the buffer memory 70. High-speed data transfer is also achieved between the frame memory in the display processing unit 44 and the buffer memory 70. The control unit 100 of the embodiment achieves high-speed image processing by running a plurality of SPU's in parallel. The display processing unit 44 is connected to the display device 12 and outputs a result of image processing in accordance with user request.

The image processing device 10 according to the embodiment is configured to load part of the compressed image data from the hard disk drive 50 into the main memory 60 in order to change a displayed image smoothly as the displayed image is enlarged/reduced or the display area is moved. Further, the device 10 is configured to decode part of the compressed image data loaded into the main memory 60 and store the decoded data in the buffer memory 70. This allows instant switching of images used for creation of a displayed image when the switching is required later.

The data structure of an image displayed according to the embodiment is non-limiting, but an embodiment that uses hierarchical image data having a hierarchical structure in order to display a high-definition image efficiently will be described. Hierarchical image data comprises images of different resolutions generated by reducing the size of an original image in a plurality of stages. An image in each layer is divided into one or a plurality of tile images. For example, the image with the lowest resolution comprises one tile image. The original image with the highest resolution comprises the largest number of tile images. Images are displayed such that an enlarged view or reduced view is presented efficiently by switching an image currently used for rendering to a tile image of a different layer when the displayed image reaches a predetermined resolution.

Figure 4:
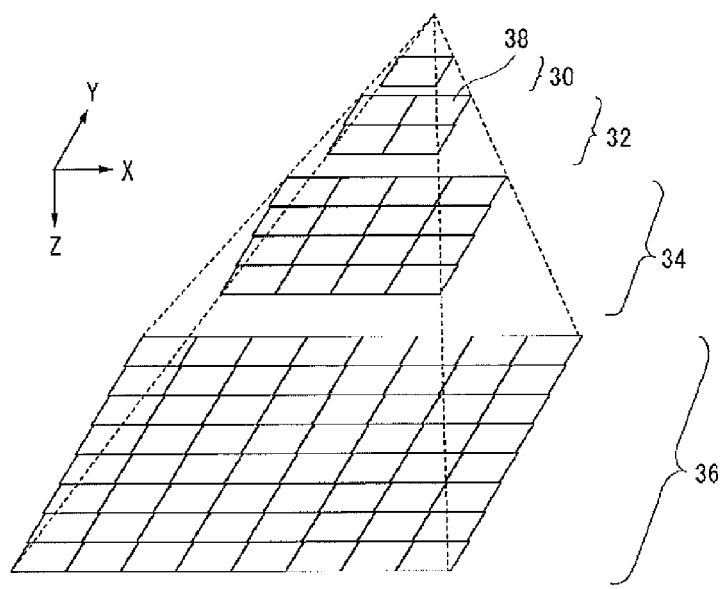
FIG. 4 schematically shows the hierarchical structure of image data used in this embodiment.

FIG. 4 schematically shows the hierarchical structure of image data used in this embodiment. The image data has a hierarchical structure comprising a 0-th layer 30, a first layer 32, a second layer 34, and a third layer 36 in the direction of depth (Z axis). While the figure only shows four layers, the number of layers is nonrestrictive. Hereinafter, image data having such a hierarchical structure will be referred to as "hierarchical data". The hierarchical data is illustrated only schematically in the figure. In practice, an image is represented using a plurality of sets of data as described later.

The hierarchical image data shown in FIG. 4 has a quadtree hierarchical structure. Each layer comprises one or more tile images 38. All of the tile images 38 are formed to have the same size having the same number of pixels. For example, an image includes 256×256 pixels. The image data in the respective layers are representations of an image in different resolutions. The original image in the third layer 36 having the highest resolution is reduced in a plurality of stages to generate the image data for the second layer 34, the first layer 32, and the 0-th layer 30. For example, the resolution in the Nth layer (N is an integer equal to or greater than 0) may be ½ the resolution of the (N+1)th layer in both the horizontal (X axis) direction and the vertical (Y axis) direction.

In the image processing device, 10, the hierarchical image data is compressed in a predefined compression format and is stored in a storage device such as the hard disk drive 50 and is read from the storage device and decoded before being displayed on the display. The image processing device 10 according to the embodiment is provided with the decoding function compatible with a plurality of compression formats. For example, the device is capable of decoding compressed data in the S3TC format, JPEG format, JPEG2000 format.

As shown in FIG. 4, the hierarchical structure of hierarchical data is configured such that the horizontal direction is defined along the X axis, the vertical direction is defined along the Y axis, and the depth direction is defined along the Z axis, thereby building a virtual three-dimensional space. Upon deriving the amount of change in the displayed image by referring to the signal supplied from the input device 20 and requesting movement of the viewpoint, the image processing device 10 uses the amount of change to derive the coordinates at the four corners of a frame (frame coordinates) in the virtual space. Frame coordinates in the virtual space are used to load compressed data into the main memory or render a displayed image. Instead of the frame coordinates in the virtual space, the image processing device 10 may derive information identifying the layer and the texture coordinates (UV coordinates) in the layer. Hereinafter, the combination of the information identifying the layer and the texture coordinates will also be referred to as frame coordinates.

Irrespective of whether the data structure is hierarchical or not, an image is basically represented using a color map that maintains color information for each pixel. In addition to a color map, the embodiment introduces roughness information for representing the roughness of an object so as to represent a detailed structure such as the touch on the surface of a painting in a manner that gives viewers a more realistic sensation. Accordingly, a color map and roughness information are collectively referred to as image data.

Figure 5:
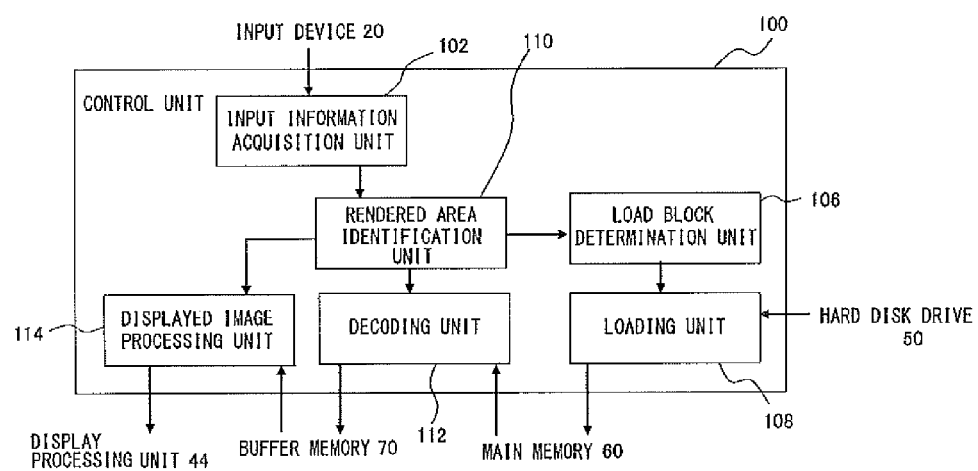
FIG. 5 shows the detailed configuration of the control unit according to the embodiment having the function of displaying an image.

FIG. 5 shows the detailed configuration of the control unit 100 according to the embodiment having the function of displaying an image. The control unit 100 comprises an input information acquisition unit 102 for acquiring information entered by the user via the input device 20, a rendered area identification unit 110 for identifying a an area that should be newly displayed, a loaded block determination unit 106 for determining an image data that should be newly loaded, and a loading unit 108 for loading a necessary compressed image data from the hard disk drive 50. The control unit 100 further comprises a decoding unit 112 for decoding compressed image data and a displayed image processing unit 114 for rendering a displayed image.

Figure 12:
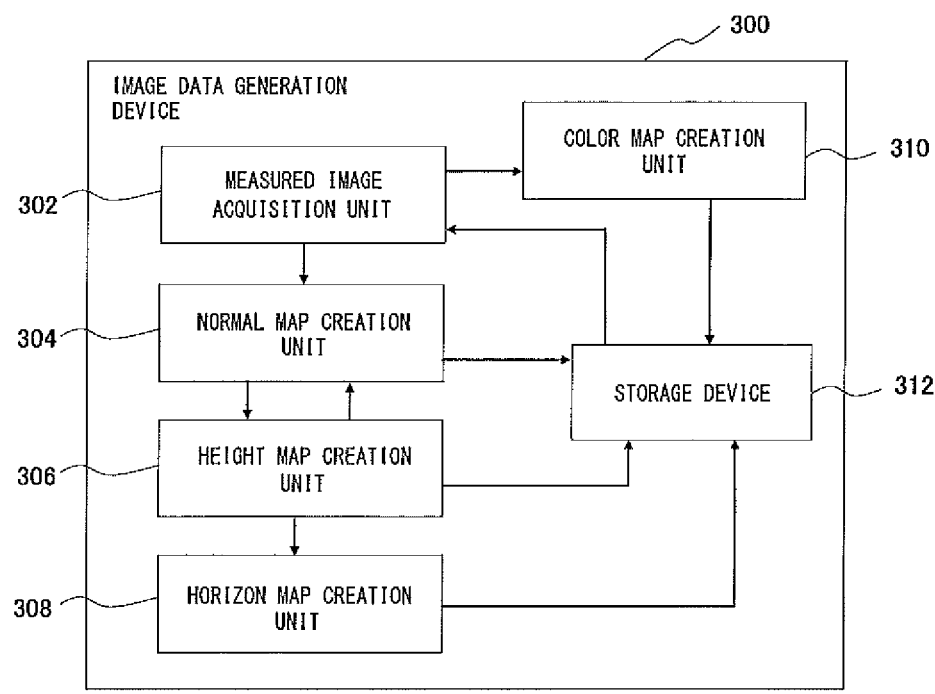
FIG. 12 shows the configuration of the image data generation device according to the embodiment for generating image data.

The elements depicted in FIG. 5 and in FIGS. 6 and 12 indicated later as functional blocks for performing various processes are implemented in hardware such as a central processing unit (CPU), memory, or other LSI's, and in software such as a programs etc., loaded into the memory. As describe above, the control unit 100 includes one PPU and a plurality of SPUs. The PPU and the SPUs form the functional blocks alone or in combination. Therefore, it will be obvious to those skilled in the art that the functional blocks may be implemented in a variety of manners by hardware only, software only, or a combination of thereof. A multicore CPU will be described by way of example, but the type of processor implementing the present invention is non-limiting.

The input information acquisition unit 102 acquires an instruction entered by the user via the input device 20 to start/terminate displaying an image, move the viewpoint, etc. The rendered area identification unit 110 identifies frame coordinates of an area that should be newly displayed, in accordance with the frame coordinates of the current display area and the information on the request for movement of the viewpoint input by the user. If the tile image including the area is already loaded in the main memory 60, the rendered area identification unit 110 supplies the information acquired as a result of the identification to the decoding unit 112. If not, the rendered area identification unit 110 supplies the information to the loaded block determination unit 106. In addition to the area that should be displayed at a point of time, the rendered area identification unit 110 may identify an area predicted to be necessary subsequently. The rendered area identification unit 110 also supplies the display processing unit 44 with the position of a new viewpoint corresponding to the request for movement of the viewpoint input by the user and with the identified frame coordinates.

The loaded block determination unit 106 identifies data for a tile image that should be newly loaded from the hard disk drive 50 into the main memory 60 by referring to the information from the rendered area identification unit 110 and issues a load request to the loading unit 108. While the loading unit 108 is not performing a loading process, the loaded block determination unit 106 may issue a load request according to a predetermined timing schedule. For example, the loaded block determination unit 106 may issue a load request at predetermined time intervals or when the user issues a request for movement of the viewpoint. The loading unit 108 loads the data for a compressed image from the hard disk drive 50 into the main memory 60 in accordance with a request from the loaded block determination unit 106.

The decoding unit 112 refers to the frame coordinates of the area that should be newly displayed as acquired from the rendered area identification unit 110 and searches the buffer memory accordingly. If the area at the frame coordinates is not stored in the buffer memory 70, the decoding unit 112 reads the data for a tile image from the main memory 60, decodes the read data, and stores the decoded data in the buffer memory 70. The displayed image processing unit 114 refers to the frame coordinates of the area that should be newly displayed and reads the corresponding image data from the buffer memory 70. The displayed image processing unit 114 renders the displayed image in the frame memory of the display processing unit 44. In this process, the displayed image processing unit 114 uses the roughness information to represent change, associated with the movement of the viewpoint, in the way that an object is viewed in the presence of roughness on the object.

Figure 6:
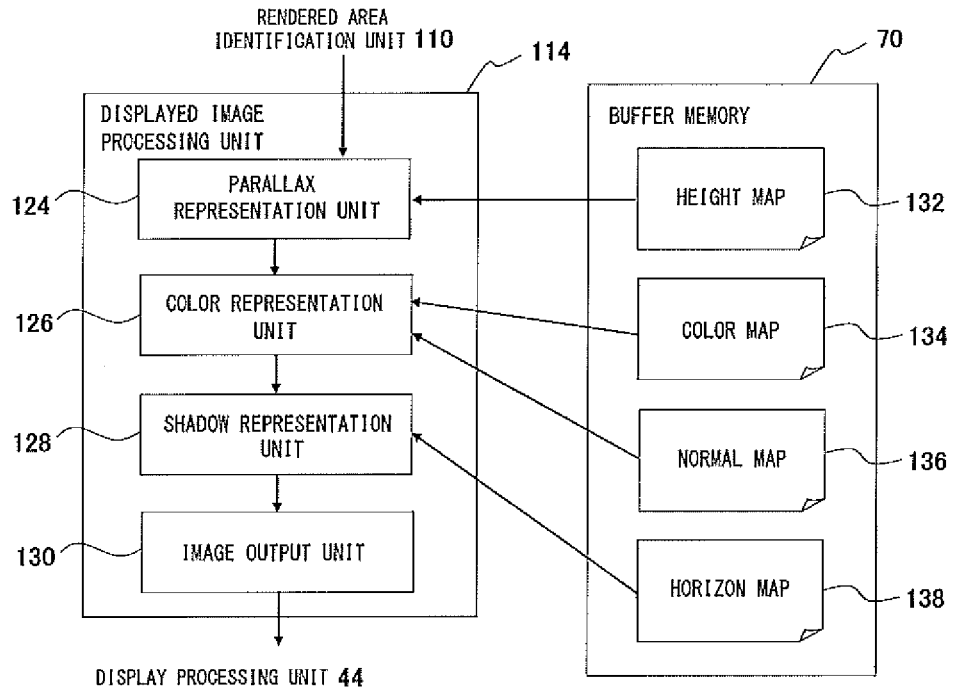
FIG. 6 shows the configuration of the displayed image processing unit and the buffer memory in further detail.

FIG. 6 shows the configuration of the displayed image processing unit 114 and the buffer memory 70 in further detail. As described above, the image data includes roughness information as well as a color map that maintains color information for each pixel. Therefore, in addition to a color map, the loading unit 108 and the decoding unit 112 loads or decodes the roughness information necessary for display. The decoded data is stored in the buffer memory 70. As shown in FIG. 6, a height map 132, a normal map 136, and a horizon map 138 are used to form roughness information. Each of the height map 132, the normal map 136, and the horizon map 138 maintains data for respective pixels.

The displayed image processing unit 114 includes a parallax representation unit 124 that uses the height map 132 to compute shifts in coordinates due to parallax, a color representation unit 126 that uses the color map 134 and the normal map 136 to represent a color of an object in a way that the roughness is considered, a shadow representation unit 128 that uses the horizon map 138 to shadow an image, and an image output unit 130 that renders an image to be ultimately displayed in the frame memory.

The parallax representation unit 124 uses the height map 132 that maintains height information of an object for respective pixels to represent different views caused by the height of the object and associated with the movement of the viewpoint, in the form of shifts in coordinates. For actual computation, the technology generally proposed as parallax mapping may be introduced (see, for example, Natalya Tatarchuk, Dynamic parallax occlusion mapping with approximate soft shadows, Symposium on Interactive 3D Graphics, Proceedings of the 2006 symposium on Interactive 3D graphics and games, P. 63-69, 2006).

Figure 7:
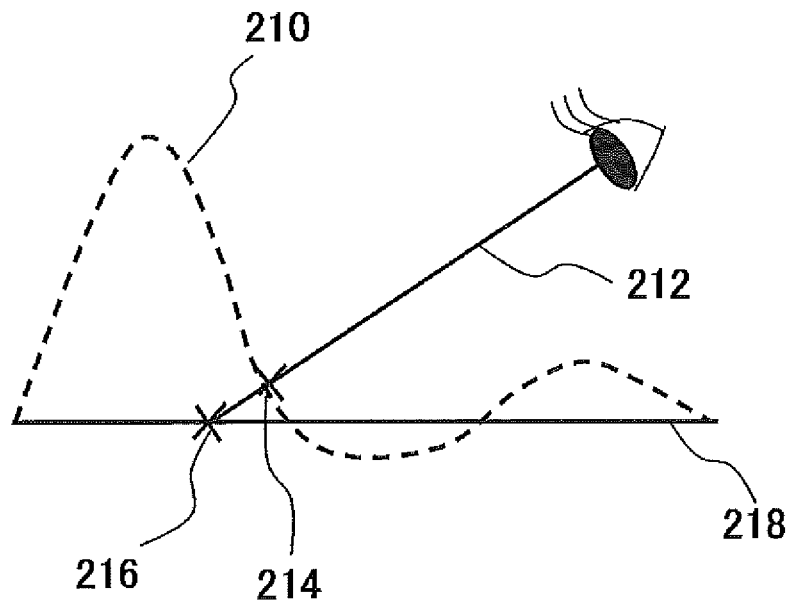
FIG. 7 illustrates the principle of parallax mapping.

FIG. 7 illustrates the principle of parallax mapping. Where a shape 210 of an object has roughness with respect to an image plane 218 as shown, a point 214 on the surface of the object on a line of sight 212 is viewed as being at a point 216 on the image plane. Therefore, the parallax representation unit 124 creates new coordinates resulting in a change in the pixel position such that the color information of the pixel at the point 214 is shifted to the position of the point 216. For this purpose, the parallax representation unit 124 uses the height map representing the shape 210 in a linear search process to identify the points 214 and 216 of intersection between the line of sight 212 from a new viewpoint learned from the rendered area identification unit 110 and the shape 210 of the object and between the line of sight 212 and the image plane. The parallax representation unit 124 represent shift between pixels occurring when the original image is rendered as a displayed image, in the form of, for example, texture coordinate values.

The color representation unit 126 uses, for example, the texture coordinate values derived by the parallax representation unit 124 to render the image, shifting the pixel defined in the color map 134. In this process, the color representation unit 126 uses the normal map 136 that maintains normals to the surface of the object for each pixel to change the way that light impinges on the surface and represent the roughness accordingly. The color representation unit 126 may use bump mapping, which is generally used in computer graphics, to perform the above process.

The shadow representation unit 128 uses the horizon map 138, which maintains, for each pixel, information indicating whether a shadow is cast depending on the angle relative to the light source, so as to shadow the image rendered by the color representation unit 126. For this purpose, a generally proposed technology called horizon mapping can be introduced (see, for example, Peter-Pike J. Sloan et al., Interactive Horizon Mapping, Eurographics Rendering Workshop 2000, June, 2000).

Figure 8:
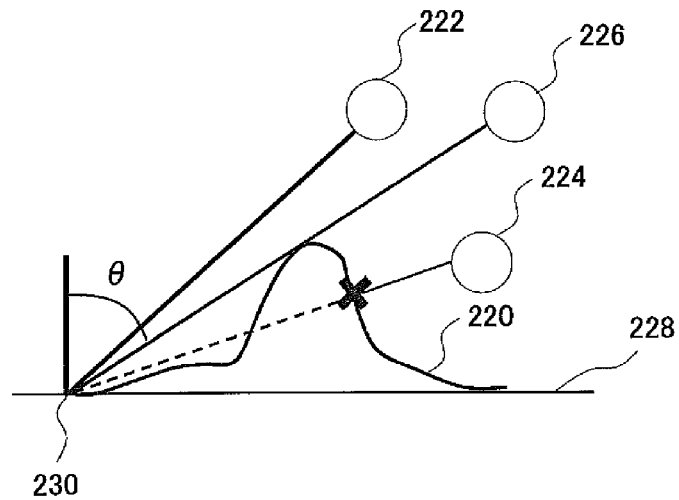
FIG. 8 illustrates the principle of horizon mapping.

FIG. 8 illustrates the principle of horizon mapping. If a shape 220 of an object has irregularities with respect to an image plane 228 as shown, the light from a light source 222 is not blocked so that a shadow is not created at a point 230, but the light from a light source 224 is blocked so that a shadow is created. Whether a shadow is created at the point 230 is determined by the boundary angle of a light source 226. Binary data is prepared indicating whether a shadow is created as an angle $\theta$ of the light source relative to a line from each pixel, such as the point 230, perpendicular to the image plane is varied in stages.

The shadow representation unit 128 compares the horizon map with the predefined position of a light source or the position of a light source determined according to a rule that defines the position as varying in association with the movement of the viewpoint. The shadow representation unit 128 shadows necessary pixels accordingly. The image output unit 130 outputs data for an image rendered as described above to the frame memory of the display processing unit 44.

When the color map 134 is configured as hierarchical data as described above, the height map 132, the normal map 136, and the horizon map 138 may also be configured as hierarchical data. In this case, the maps other than the color map 134 are also divided into tile images. The data for tile images necessary to display an image is loaded as appropriate and decoded. By configuring the maps to comprise hierarchical structures having same resolutions, the displayed image can be rendered through similar processes at different resolutions only by globally switching the data layer for use, even if the resolution of the displayed image is changed significantly. Thus, a detailed image representing the roughness on the object can be displayed efficiently.

By configuring the color map 134 as hierarchical data, the image can be displayed responsively over a wider range of resolutions than when image data of a single resolution is used. The appearance of an object changes depending on whether the object viewed from a remote location or at close hand, and the change is associated with a change in the resolution. In order to represent such variation in appearance in the displayed image, the above-described process, which uses the roughness information, may be varied depending on the height of the viewpoint, i.e., the resolution.

Figure 9:
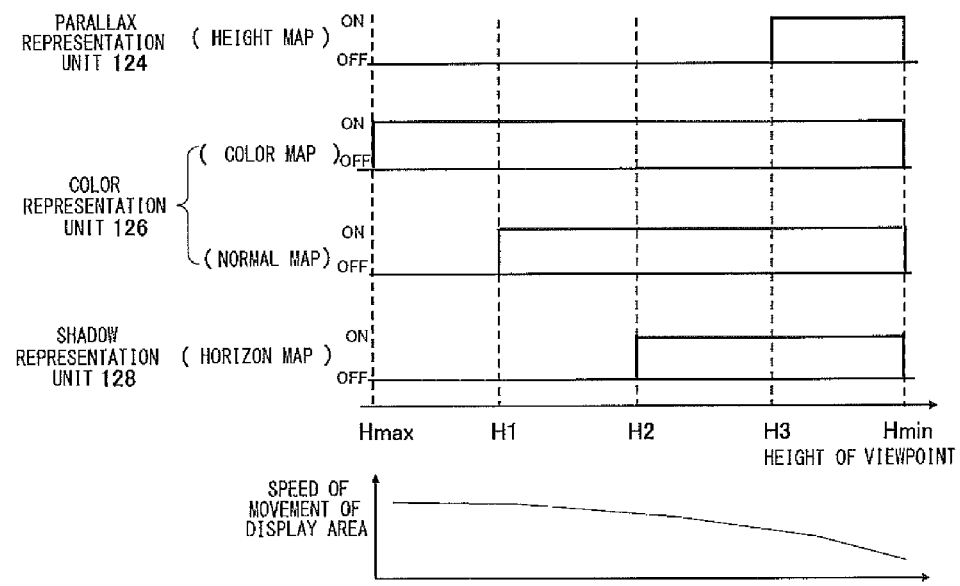
FIG. 9 shows an example in which the process performed by the displayed image processing unit is changed according to the height of the viewpoint.

FIG. 9 shows an example in which the process performed by the displayed image processing unit 114 is changed according to the height of the viewpoint. Referring to FIG. 9, the horizontal axis represents the height of the viewpoint. The more toward right, the closer toward the image plane. From top to bottom, the charts plotted against variation in the viewpoint denote activation/inactivation of the process performed by the parallax representation unit 124 using the height map 132, the process performed by the color representation unit 126 using the color map 134, the process performed by the color representation unit 126 using the normal map 136, and the process performed by the shadow representation unit 128 using the horizon map 138.

The roughness or a shadow is unlikely to be perceived by the viewer who is sufficiently remote from the object. Parallax is unlikely to be generated, either. Correspondingly, in a range between the maximum viewpoint height Hmax and a predefined threshold value H1, only the color representation unit 126 is activated and renders the image using only the color map and without performing bump mapping. In a range between H1 and the next threshold value H2 of the height of the viewpoint, the color representation unit 126 uses the color map 134 and the normal map 136 to render the image to represent the roughness. In this condition, the parallax representation unit 124 and the shadow representation unit 128 are not activated.

In a range between H2 and the next threshold value H3 of the height of the viewpoint, the viewer is assumed to be able to perceive a shadow of the roughness so that the shadow representation unit 128 is activated in addition to the color representation unit 126 to shadow the object using the horizon map 138. In a range between H3 and the minimum value Hmin of the height of the viewpoint, impact of parallax is increased so that the parallax representation unit 124 is activated in addition to the color representation unit 126 and the shadow representation unit 128 to represent shifts in pixels due to parallax.

By varying the content of processing for rendering an image depending on the height of the viewpoint as described above, variation in appearance perceived in a real word by a human being associated with variation in distance from an object can be represented. The processing load is prevented from being increased by performing only necessary steps. The threshold value of the viewpoint height at which to switch the process may be identical to the height at which the layer for use in display is switched. The threshold value may be changed depending on the ratio between the maximum value of the height of an object retrieved from the height map and the height of the viewpoint. To shadow an object using the horizon map, the direction of a light source may be changed in accordance with the height of the viewpoint. Further, a point light source and a surface light source may be switchably used. By varying the light source, the latitude of available representation is extended.

Figure 10:
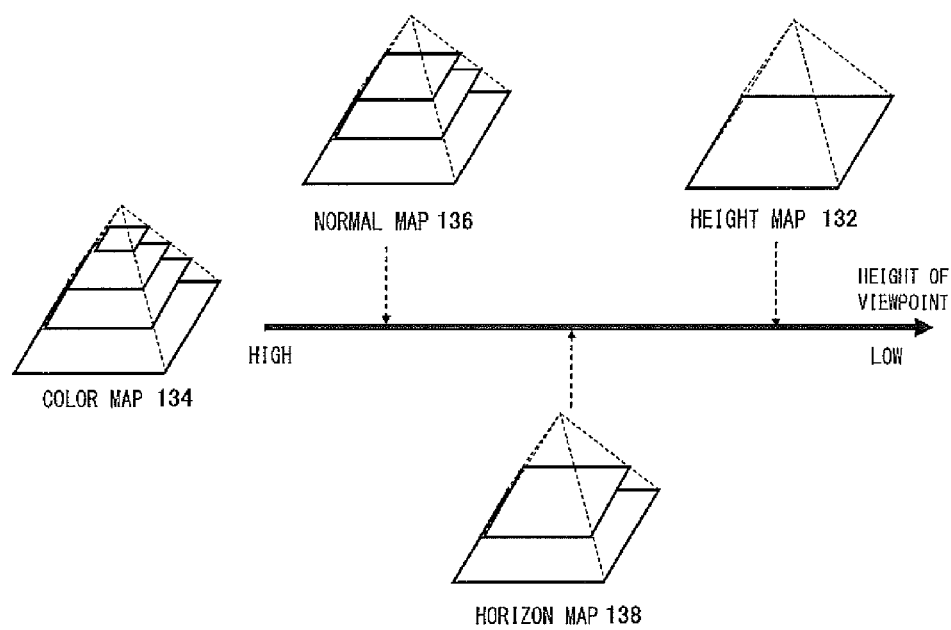
FIG. 10 schematically shows the color map, the height map, the normal map, and the horizon map according to the embodiment having different data structures.

When the number of processes performed by the displayed image processing unit 114 is increased as the viewpoint is lowered as described above, the display area may be moved slower as the viewpoint is lowered, as indicated at the bottom of FIG. 9, thereby allowing for more time for the processes. More specifically, the time elapsed since an input of a signal until the image corresponding to the signal is displayed may be adjusted by setting the peak value of a transfer function such as a Gauss function to be lower as the viewpoint is lowered and by convoluting the function with a signal input by the user to request movement of the viewpoint.

Where the color map 134, the height map 132, the normal map 136, and the horizon map 138 are configured as hierarchical data, the number of layers in maps may be different from each other, if used maps are changed depending on the height of the viewpoint as described above. FIG. 10 schematically shows the color map 134, the height map 132, the normal map 136, and the horizon map 138 having different data structures. Referring to the figure, the horizontal axis represents the height of the viewpoint. The more toward right, the closer the image plane. The hierarchical structure of the maps is illustrated similarly as FIG. 4.

As shown in FIG. 10, the color map 134 is necessary for every height of the viewpoint, i.e., for all resolutions and so contains the largest number of layers. By configuring bump mapping, which uses the normal map 136, to be performed from the height of the viewpoint established when starting to display an image using the first layer, next to the topmost 0-th layer, of the color map 134, the normal map 136 as prepared need only contain layers corresponding to the first layer and below of the color map 134.

By configuring horizon mapping, which uses the horizon map 138, to be performed from the height of the viewpoint established when starting to display an image using the second layer of the color map 134, the horizon map 138 as prepared need only contain layers corresponding to the second layer and below of the color map 134. Similarly, by configuring parallax mapping to be performed from the height of the viewpoint established when starting to display an image using the third layer of the color map 134, the height map 132 as prepared need only contain layers corresponding to the third layer and below of the color map 134.

By preparing data as described above, the size of the image data as a whole can be reduced. The variation of the combination of processes dependent on the variation of the height of the viewpoint as illustrated in FIGS. 9 and 10 is by way of example only. The variation may appropriately be defined depending on the characteristics of an object in the image, intent of the creator of image data, etc. Depending on the characteristics of an image to be displayed, the number of layers in the maps may be determined independently of the variation in the processes determined by the height of the viewpoint.

While the image processing device 10 is being connected to a network, some maps or some layers may be subject to fees so that only those users who paid the fee can download the maps or layers. For example, only the color map 134 may be provided at a low price. When the user displaying the image using the color map 134 enlarges the image until the resolution at which an additional map can be applied is reached, a message prompting the user to indicate whether to purchase the map will be displayed. When the user indicates a request for purchase, the additional map can be downloaded.

The image processing device 10 uses the newly downloaded map to perform the associated process. This allows the user to view a hitherto unrevealed high-definition image in which the roughness is represented. As regards the color map 134, only low-resolution layers may be provided initially, and the user may be billed for downloading high-resolution layers necessary for an enlarged view.

Figure 11:
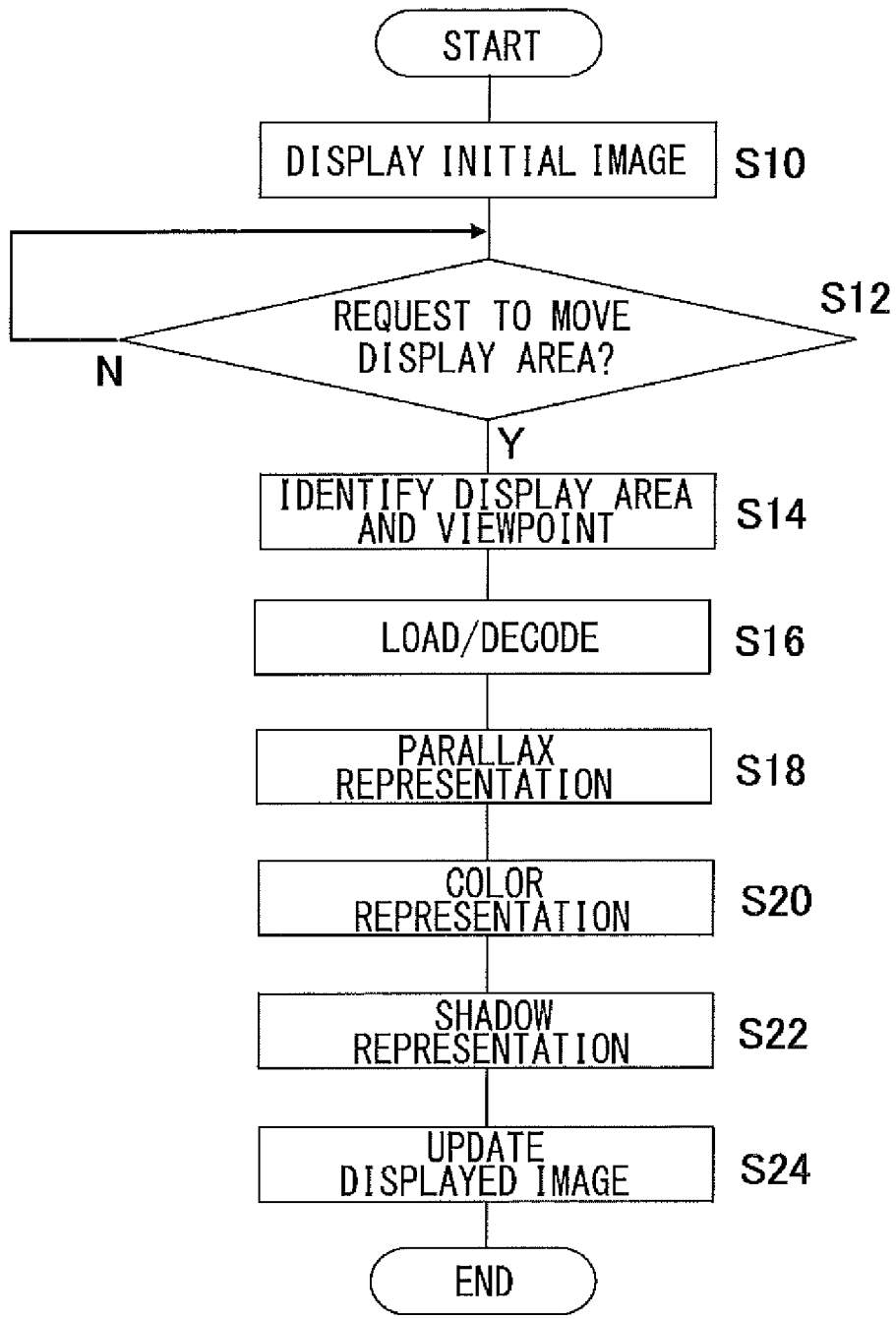
FIG. 11 is a flowchart showing the steps performed to display an image according to the embodiment.

A description will now be given of the operation of the image processing device 10 having the configuration described above. FIG. 11 is a flowchart showing the steps performed to display an image. Image data necessary to display a predefined initial image (e.g., the entirety of the image to be displayed) is read from the hard disk drive 50 in response to, for example, a user request to start displaying an image. The read image data is decoded to create a displayed image and the created image is displayed (S10). The initial image continues to be displayed until the user inputs a request for movement of the viewpoint via the input device 20 (N in S12, S10). When a request for movement of a display area is made (Y in S12), the rendered area identification unit 110 of the control unit 100 derives the frame coordinates of the display area to be newly displayed in response to the request, and the new viewpoint (S14).

The data necessary to render a new image is loaded as necessary by the loading unit 108 from the hard disk drive 50. The decoding unit 112 decodes the loaded data and stores the decoded data in the buffer memory 70 (S16). The parallax representation unit 124 of the displayed image processing unit 114 reads the height map 132 in the buffer memory 70 and computes pixel shifts due to parallax by performing parallax mapping (S18). Subsequently, the color representation unit 126 reads the color map 134 and the normal map 136 in the buffer memory 70 and renders the image, representing the roughness (S20).

Subsequently, the shadow representation unit 128 reads the horizon map 138 in the buffer memory 70 and shadows the image by performing horizon mapping (S22). As described above, the steps S18, S20, and S22 may be performed selectively according to the height of the viewpoint or other settings. Bump mapping in S20 may map the color map 134 directly, assuming that the normals are all perpendicular. The image thus rendered is written in the frame memory of the displayed image processing unit 44 and displayed on the display device 12. In this way, the displayed image is updated (S24).

A description will now be given of the method of creating image data used in the embodiment. FIG. 12 shows the configuration of the image data generation device according to the embodiment for generating image data. An image data generation device 300 comprises a measured image acquisition unit 302 for acquiring a measured image capturing an object, a normal map creation unit 304 for acquiring a normal map from a measured image or, as the case requires, from a height map, a height map creation unit 306 for creating a height map from the normal map, a horizon map creation unit 308 for creating a horizon map from the height map, a color map creation unit 310 for creating a color map from the measured image, and a storage device 312 for compressing the data for the created maps and storing the compressed data.

The measured image acquisition unit 302 acquires data for a measured image by acquiring three or more sets of image data captured by fixing a camera immediately above an object and varying the direction of a light source in three or more patterns. The data for a measured image may be stored in the storage device 312 and read therefrom. Alternatively, the measured image acquisition unit 302 may itself be configured as a camera capable of acquiring the data by shooting an image of the object. The light source may be oriented in a total of nine directions including eight directions around the center of the object, and the same direction as that of the camera. This allows nine measured images to be acquired.

The normal map creation unit 304 acquires normal vectors of the pixels by using the measured image. The normal vectors are acquired by using the photometric stereo method. More specifically, the following expression is solved for n.

$$Ii = \rho \vec{L_i}^T \vec{n}$$

where n denotes a normal vector, ρ denotes a surface reflectivity, Li denotes the vector in the i-th direction of the light source, and Ii denotes the brightness captured by the camera in the presence of the light source.

Given that the surface reflectivity ρ is known, three of the above expressions will be necessary to acquire x, y, and z coordinates, which are elements of the normal vector n. If the measured image comprises nine image acquired in the presence of a light source oriented in nine directions, those of the images showing secular reflection and those showing shadows are detected by referring to the color information of the pixels and excluded to define the above expression. Consequently, the normal vector can be derived with high precision.

The height map creation unit 306 determines the inclination of the object in a predetermined direction by referring to the normal vector in the normal map created by the normal map creation unit 304. The height map creation unit 306 acquires height information for each row of pixels by incrementally adding a difference in height acquired from the inclination and creates a height map accordingly. Details will be described later.

The horizon map creation unit 308 creates a horizon map using the height map created by the height map creation unit. As described above, the horizon map represents data indicating whether a shadow is cast depending on the inclination of the light source. Therefore, the data for the horizon map is acquired by virtually orienting the light source in predefined directions, if the height information of the object is available from the height map.

In the RGBA color mode, for example, four types of data representing red, green, blue, and alpha values, respectively, are maintained for each pixel. Generally, a total of 256 values of shades can be defined for each type of data. By using the above data structure directly, it is possible to maintain, for each pixel, information indicating whether a shadow is cast as the angle formed between the normal to the image plane and the light sources oriented in each of the four directions above the image plane is varied in 256 steps. By preparing two sets of such data, horizon maps for light sources oriented in a total of eight directions can be created.

Of the measured images, the color map creation unit 310 acquires the color information of each pixel from the measured image captured when the light source is oriented in the same direction as the camera and creates a color map accordingly. The maps created by the normal map creation unit 304, the height map creation unit 306, the horizon map creation unit 308, and the color map creation unit 310 are compressed and stored in the storage device 312. As described later, the normal map creation unit 304, the height map creation unit 306, the horizon map creation unit 308, and the color map creation unit 310 may create hierarchical data for the respective maps. In this case, the data for each layer may be compressed in units of tile images produced by dividing the data into predetermined sizes, as shown in FIG. 4.

Figure 13:
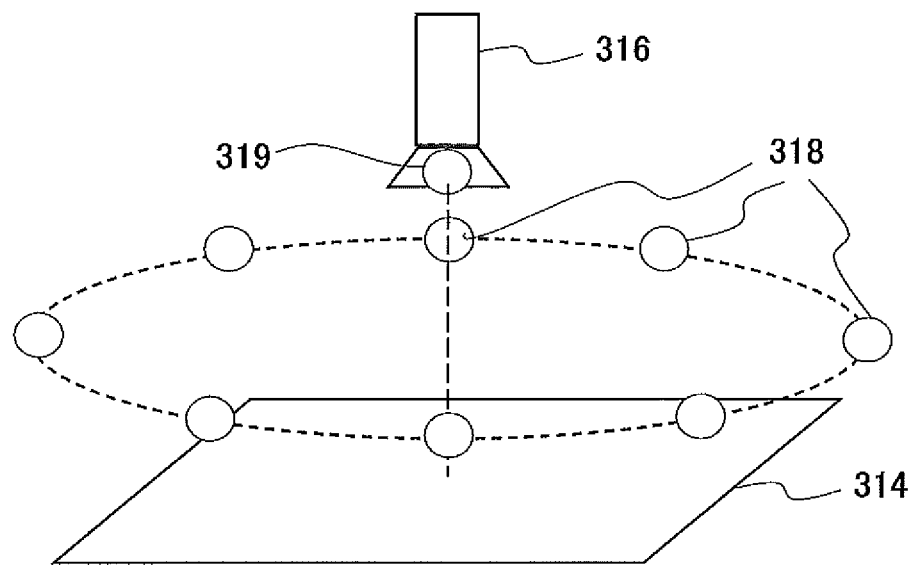
FIG. 13 illustrates how a measured image is acquired when the measured image acquisition unit is configured as a camera.

FIG. 13 illustrates how a measured image is acquired when the measured image acquisition unit 302 is configured as a camera. A camera 316 is fixed immediately above an object 314 such as a painting. Light sources 318 are located on a circle at a predefined height and centered around the center of the object. In the figure, eight light sources are located on a circle. A light source 319 is located at the same position as the camera. The camera 316 captures images of the object 314 as the light sources are turned on one by one.

In this case, a strobe device in a ring arrangement provided with a plurality of light sources 318 may be prepared so that the light sources are turned on in turns. Alternatively, a strobe device provided with one light source 318 movable on a circle may be prepared so that images are captured in the presence of the light source oriented in multiple directions by moving the light source 318 on a circle in synchronization with the shooting by the camera 316. Alternatively, the light source may be moved manually. This will reduce the cost required for measurement.

Figure 14:
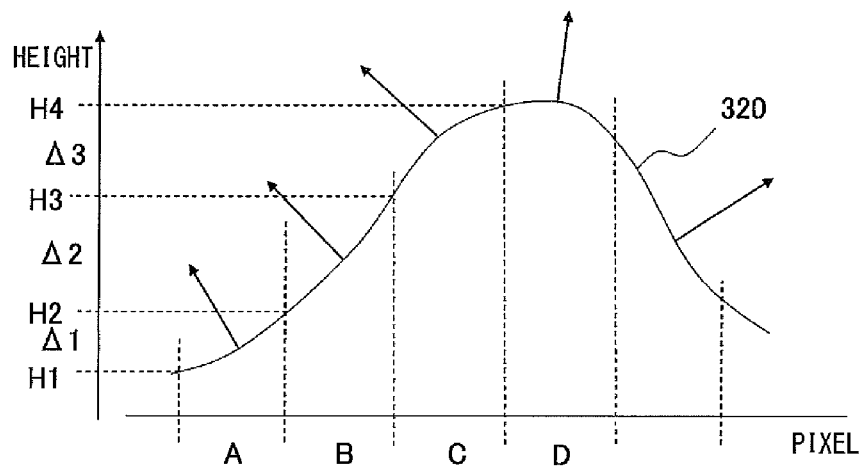
FIG. 14 illustrates the principle according to the embodiment whereby the height map creation unit creates a height map using the normal map.

FIG. 14 illustrates the principle whereby the height map creation unit 306 creates a height map using the normal map. Referring to the figure, the horizontal direction represents the image plane and the object is assumed to have a shape 320. Providing that an area demarked by vertical broken lines represents one pixel, the normal map maintains information on a component of a normal vector denoted by an arrow for each pixel in the figure.

The height map creation unit 306 scans the normal map in a predefined direction and computes the inclination of the object in that direction pixel-by-pixel, by referring to the normal vector. By adding the height of the object at the boundary between the current pixel and the previous pixel located along the line of scan to the difference in height acquired from the inclination of the current pixel, the height map creation unit 306 computes the height at the boundary between the current pixel and the next pixel.

In the case, the FIG. 14, providing that a scan proceeds from A, B, C, D, . . . , height H2, which is computed by adding height difference $\Delta 1$ acquired from the inclination of pixel A to height H1 of the object at the boundary between pixel A and the pixel to the left, represents the height at the boundary between pixel A and pixel B. Height H3, which is computed by adding height difference $\Delta 2$ acquired from the inclination of pixel B to height H2, represents the height at the boundary between pixel B and pixel C. Height H4, which is computed by adding height difference $\Delta 3$ of pixel C to height H3, represents the height at the boundary between pixel C and pixel D.

By repeating the steps from the left edge to the right edge of the image, the height information for a row of pixels is acquired. An initial value of, for example, 0.5 may be assigned to the height at the left edge. By running such a row-by-row process for all rows in the image, the height information on all pixels constituting the image, i.e., the height map, is acquired. Since the processes for the respective rows are independent, the time required for processing can be reduced by running the processes in parallel.

Through the process shown in FIG. 14, a highly precise height map of a continuously graded object can be acquired. In the case of an object with discontinuous steps, adjacent pixels may differ in the height, but the normal vectors may not reflect the difference in the height. To maintain precision in such a case, the height map creation unit 306 further acquires similar height information in alternative directions by using the same normal map. For example, the image is scanned in four directions including top to bottom, right to left, bottom to top, in addition to left to right described above, so as to create four height maps. The value obtained by averaging the height maintained by the four height maps pixel by pixel is used as the height information in the ultimate height map.

An oil painting may sometimes present an abrupt step due, for example, to heavily laid paint. However, it is rare that an abrupt step is encountered in all directions in which the image is scanned. Normally, brush strokes will produce a continuous grade in at least one of the directions. If the grade is continuous, accurate height can be determined. Thus, by averaging the height maps produced by scanning the image in multiple directions, a highly precise height map can be generated.

Figure 15:
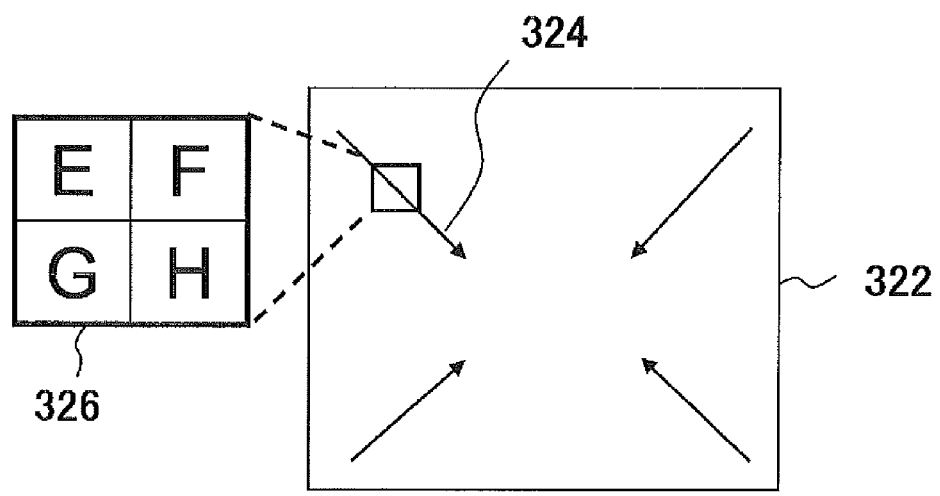
FIG. 15 illustrates a method according to the embodiment of creating a height map by diagonally scanning a normal map.

The image may be scanned diagonally instead of or in addition to the vertical and horizontal directions. FIG. 15 illustrates a method of creating a height map by diagonally scanning a normal map. In the illustrated example, an image 322 is scanned from top left to bottom right, top right to bottom left, bottom left to top right, and bottom right to top left, as indicated by arrows, all at 45° with respect to the horizontal and vertical directions of the image. Only four arrows are shown. In practice, however, all rows are scanned in the same directions to acquire height information. As a result, a total of four height maps are created. As described above, the average value at each pixel is used as data in the ultimate height map.

FIG. 15 shows an image block 326 diagonally scanned as described above, showing an enlarged view of 2×2 pixels including pixels E and H traversed by a scan line 324 and adjacent pixels F and G. To obtain the height of the object at pixel H in the image block 326, the normals at pixels F, G, and H are used to identify the inclination in the direction from E to H and the height difference in that direction is added to the height at the boundary between pixel E and pixel H. To create a height map as described above by scanning the image from top left to bottom right, initial values are assigned to one column of pixels at the left edge and to one row of pixels at the top edge. By performing a similar process in the other directions and scanning the image in the directions, a height map is acquired.

The image may be scanned in the vertical and horizontal directions and in the diagonal directions as shown in FIG. 15 so as to create eight height maps. The average value from all those maps may be used as data for the ultimate height map. The data for the ultimate height map may not necessarily be computed from multiple height maps by averaging. A variety of statistical methods may equally be applicable. For example, a deviation in the height defined in the height maps may be computed pixel by pixel. The height values that exceed a predefined threshold value are excluded before computing an average value or subjecting the surviving height values to a neural network.

Methods of data creation employed when the normal map, height map, and horizon map are configured as hierarchical data will be explained. As described above, a color map is hierarchized by locating a high-definition image in the bottom layer and creating successively reduced versions. Meanwhile, when data for the bottom layer for a normal map or a horizon map is created by using a measured image with high-definition, such data has basically independent values pixel by pixel, resulting in the difficulty of reduction. For this reason, it is not easy to create data for layers other than the bottom layer in the hierarchical data.

Figure 16:
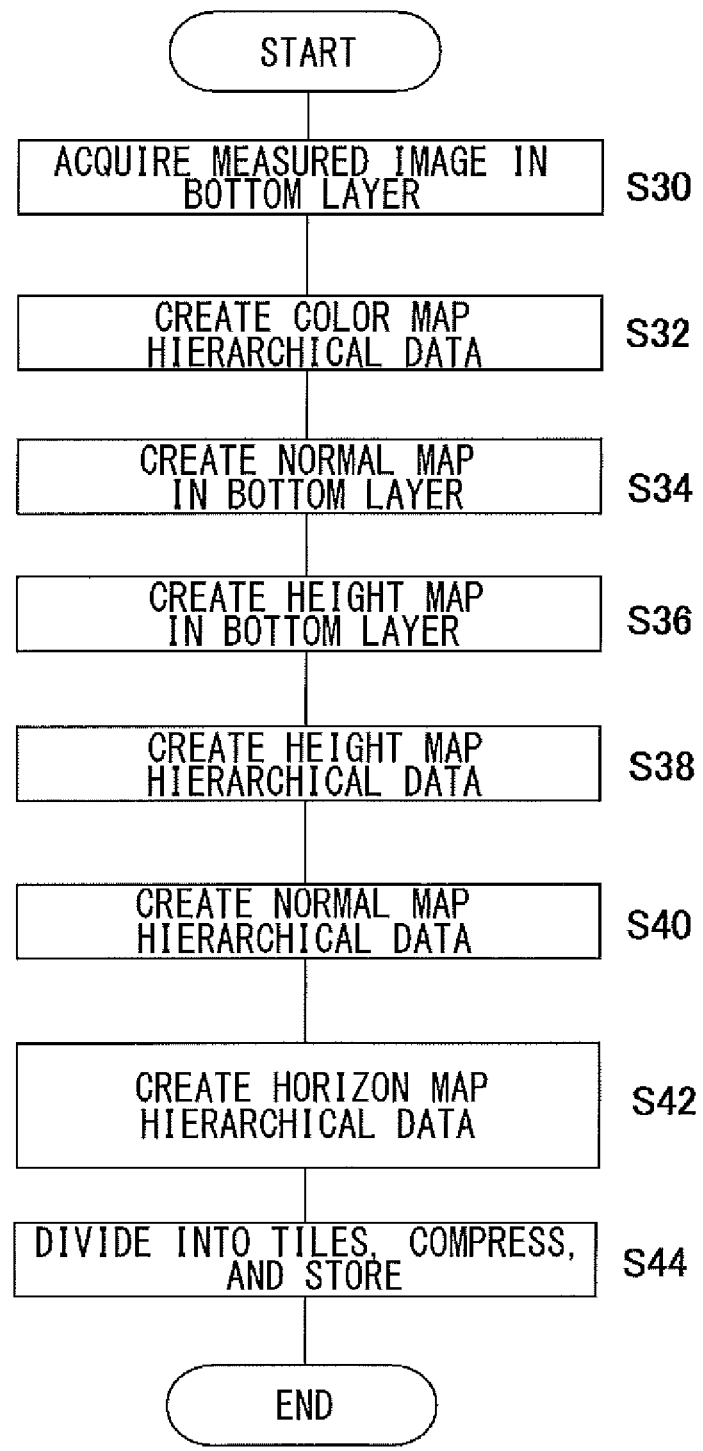
FIG. 16 is a flowchart showing the steps of creating hierarchical data for a color map, a normal map, a height map, and a horizon map.

In the embodiment described below, a high-resolution measured image corresponding to the bottom layer of a color map is used to create a normal map at the same resolution, whereupon hierarchical data for a height map is created, before returning to the process of creating hierarchical data for a normal map. FIG. 16 is a flowchart showing the steps of creating hierarchical data for a color map, a normal map, a height map, and a horizon map.

Initially, the measured image acquisition unit 302 acquires measured images of the resolution of the bottom layer in the hierarchical data, i.e., the highest resolution (S30). Of those measured images, the color map creation unit 310 acquires the image acquired when the light source is oriented in the same direction as the camera. The color map creation unit 310 creates hierarchical data for a color map by reducing the acquired image to predetermined resolutions (S32).

The normal map creation unit 304 uses the measured image to create a normal map of the resolution corresponding to the image in the bottom layer of the color map (S34). The resultant data represents the data for the bottom layer in the hierarchical data for the normal map. Subsequently, the height map creation unit 306 creates a height map in the bottom layer by, for example, scanning the normal map in the bottom layer obtained in S34 in a predefined direction and averaging the values (S36). Subsequently, the height map creation unit 306 successively reduces the height map in the bottom layer, using a method generally used to reduce an image (e.g., bilinear method) so as to create hierarchical data corresponding to the hierarchical data for the color map (S38).

The normal map creation unit 304 generates layers of the normal map by differentiating height maps of respective layers other than the bottom layer in the hierarchical data for the height map thus created, so as to build hierarchical data (S40). More specifically, the normal map creation unit 304 scans the height maps in the respective layers in, for example, two directions (the vertical direction and the horizontal direction) and differentiates the height maps, thereby obtaining information on the inclination of the object in the respective directions. The normal map creation unit 304 obtains ultimate normal vectors by synthesizing the normal vectors for respective scan directions obtained for each pixel from the inclination, and creates a normal map accordingly. Meanwhile, the horizon map creation unit 308 generates the layers of the horizon map from the respective layers of the height map, and creates hierarchical data accordingly (S42). Each of the maps thus created is divided into tile images before being compressed and stored in the storage device 312 (S44).

Figure 17:
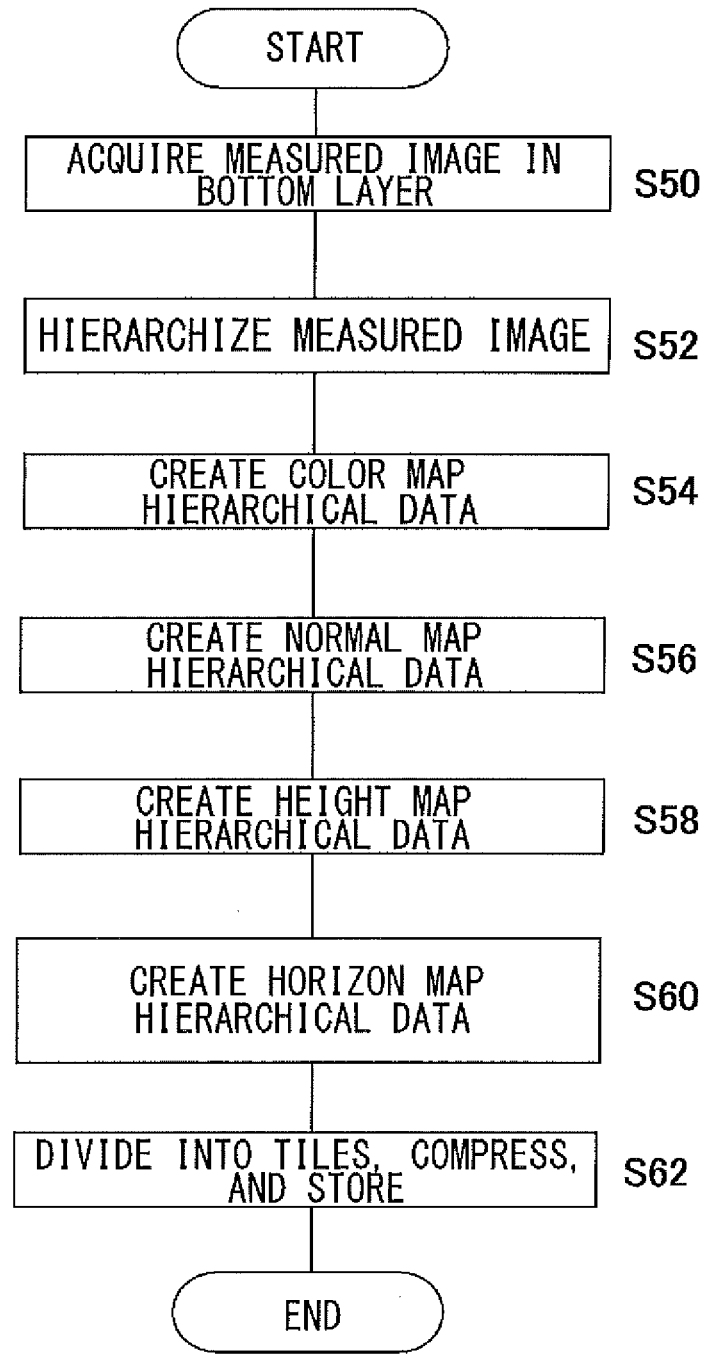
FIG. 17 is a flowchart showing alternative steps of creating hierarchical data for a color map, a normal map, a height map, and a horizon map.

FIG. 17 is a flowchart showing alternative steps of creating hierarchical data for a color map, a normal map, a height map, and a horizon map. In this example, the measured image is hierarchized first. The layers of a color map and a normal map are directly generated from the corresponding layers of the measured image. Initially, the measured image acquisition unit 302 acquires measured images of the resolution of the bottom layer in the hierarchical data, i.e., the highest resolution (S50). The measured image acquisition unit 302 hierarchizes the acquired images by successively reducing each of the measured images into predetermined sizes and generating multiple images accordingly (S52).

The color map creation unit 310 then generates the layers of a color map directly from the respective layers of the hierarchical data for the measured image acquired when the light source is oriented in the same direction as the camera, and builds hierarchical data accordingly (S54). The normal map creation unit 304 collects the measured images in the same layer and solves the equation for each layer to create normal maps for the corresponding layers and build hierarchical data accordingly (S56). The height map creation unit 306 scans a normal map in each layer of its hierarchical data for the normal map to create a height map for the corresponding layer ad build hierarchical data accordingly (S58). The horizon map creation unit 308 uses each layer in the hierarchical data for the height map to create a horizon map for the corresponding layer and build hierarchical data accordingly (S60). Each of the maps thus created is divided into tile images before being compressed and stored in the storage device 312 (S62).

By using hierarchical data, images can be displayed over a wider range of variation in the resolution than otherwise. Therefore, the image in the bottom layer may be created by concatenating multiple images obtained by capturing partial regions. In this case, the image produced by concatenating multiple images may be used as a measured image so that each map by using the measured image produced by concatenating the images. Alternatively, pre-concatenation images of the respective regions may be used as measured images. Maps generated for the respective regions may be concatenated to create an ultimate map.

According to the embodiment described above, a height map, a normal, and a horizon map are prepared as data for a displayed image in addition to a color map containing color information for each pixel. By allowing the image display device to represent parallax, roughness, and shadows, the image can be displayed in a manner that gives viewers a realistic sensation not obtainable merely by the color information. Such a mode of display achieves significant result especially in the case of objects such as oil painting in which detailed surface structure weighs.

By changing the applied process depending on the height of the viewpoint, impression given to a viewer as the distance from the object is changed can be reproduced and the processing load can be adjusted. The inventive mode can be used as a method of representation by a creator of image data. In the case that the user provides an input to request enlargement or reduction, various effects can be added in a natural motion by controlling the delay between the input signal and the update to the image to vary continuously depending on the number of processes applied to the image.

Such features will prove more effective by configuring the image data using a hierarchical structure and extending the range of variation in the resolution. By configuring the height map, the normal map, and the horizon map as well as the color map as hierarchical data, and by using the data for the same region in the corresponding layer across the maps, the processes performed will be similar irrespective of the resolution. Therefore, the data can be processed precisely and efficiently. In the case that different processes are performed depending on the height of the viewpoint, i.e., the range of resolution, the size of image data can be reduced by preparing only those layers of the height map, the normal map, and the horizon map that are necessary. By switching the applied process in association with the switching of the layer used to display an image, efficient switching is possible.

To implement such image display easily, image data is generated such that a normal map is first generated from a measured image. A height map is then generated by integrating the normal map. Generation of a height map normally requires measuring an object using a laser beam or capturing images of an object at multiple angles. According to the embodiment, the camera is fixed and only the light source is moved to different locations. By using the resultant measured image, a normal map, a height map, and a horizon map are created. Thus, image data can be created more effortlessly than otherwise. By using the results of scanning a normal map in multiple directions, the precision of a height map can be improved.

Where the maps are configured as hierarchical data, hierarchical data for the normal map can be easily generated by creating hierarchical data for the height map from the normal and then creating the layers of the normal map. The layers of the horizon map can also be generated directly from the layers of the height map. As such, it is easy to generate. Alternatively, image data can also be generated easily by hierarchizing the measured image first and then generating the maps corresponding to the respective layers to build the hierarchical data for the maps.

Described above is an explanation based on an exemplary embodiment. The embodiment is intended to be illustrative only and it will be obvious to those skilled in the art that various modifications to constituting elements and processes could be developed and that such modifications are also within the scope of the present invention.

In the embodiment described above, image data, including the maps, are created on the basis of a captured image. Meanwhile, an image data generation device may be provided with an image rendering function capable of displaying a virtual canvas of an oil painting on the screen and allowing the user to draw a painting by using an input device such as a mouse. In this case, the user is provided with the capabilities to enlarge or reduce a picture drawn. A normal map, a height map, and a horizon map are generated in association with, for example, the user's brush strokes so that roughness is presented at a predefined resolution and higher. This allows the user to draw a picture with roughness on its surface, giving the user a sensation as if he or she is drawing an oil painting.

DESCRIPTION OF THE REFERENCE NUMERALS 1 image processing system, 10 image processing device, 12 display device, 20 input device, 38 tile image, 44 display processing unit, 50 hard disk drive, 60 main memory, 70 buffer memory, 100 control unit, 102 input information acquisition unit, 106 load block determination unit, 108 loading unit, 110 rendered area identification unit, 112 decoding unit, 114 displayed image processing unit, 124 parallax representation unit, 126 color representation unit, 128 shadow representation unit, 130 image output unit, 132 height map, 134 color map, 136 normal map, 138 horizon map, 300 image data generation device, 302 measured image acquisition unit, 304 normal map creation unit, 306 height map creation unit, 308 horizon map creation unit, 310 color map creation unit, 312 storage device 312

As described above, the present invention is applicable to information processing devices such as computers, image data generation devices, game devices, and image display devices.

The invention claimed is:

1. An image processing device comprising:
   a storage unit configured to store a plurality of items of image data respectively used for a plurality of processes for rendering an image to be displayed;
   a rendered area identification unit configured to identify frame coordinates of an area that is located in the image to be displayed and that is to be newly displayed in response to a request input by a user to move a viewpoint; and
   a displayed image processing unit configured to render an area in a displayed image corresponding to the frame coordinates, by using the image data stored in the storage unit, and configured to output data for the rendered area to a display device,
   wherein, the displayed image processing unit determines which of one or more processes to perform among the plurality of processes that respectively use the plurality of items of image data, depending on the height of a viewpoint responsive to the request to move the viewpoint.

2. The image processing device according to claim 1, wherein processes performed by the displayed image processing unit include at least one of the following:
   a process of representing a color by using a color map which is contained in the image data and maintains color information for each pixel;
   a process of representing parallax relative to an object in an image by performing parallax mapping by using the viewpoint and a height map which is contained in the image data and maintains, for each pixel, information on the height of the object relative to an image plane;
   a process of representing surface roughness of an object in an image by performing bump mapping by using a normal map which is contained in the image data and maintains, for each pixel, information on a normal vector on the surface of the object; and
   a process of using a horizon map which is contained in the image data and maintains, for each pixel, information on a direction of a light source when a shadow of an object is cast on the pixel, to perform horizon mapping so as to cast a shadow corresponding to a predefined direction of the light source.

3. The image processing device according to claim 1, wherein the closer the viewpoint is to the image plane, the larger the number of processes performed by the displayed image processing unit will be.

4. The image processing device according to claim 1, wherein:
   the image data has a hierarchical structure hierarchizing, in order of resolution, two-dimensional data corresponding to a plurality of image planes that are representations of a single image in different resolutions, and the displayed image processing unit switches the layer of data for use depending on the height of the viewpoint.

5. The image processing device according to claim 4, wherein:
the displayed image processing unit switches the process concurrently with switching the layer of data for use, and
the image data has a hierarchical structure that only comprises layers of data used by the displayed image processing unit.

6. The image processing device according to claim 2, wherein the direction of a light source, which is used in the representing roughness or during shadow processing by the displayed image processing unit, varies depending on the height of the viewpoint.

7. The image processing device according to claim 1, wherein the displayed image processing unit adjusts the speed of updating a displayed image such that, the larger the number of processes performed, the more delay occurs from the input request to move a viewpoint to the updating of the displayed image.

8. An image data generation device for generating data for an image capturing an object, comprising:
a measured image acquisition unit configured to acquire a plurality of measured images capturing the object in different directions of a light source;
a color map creation unit configured to create a color map from one of the measured images captured when the light source is in a predefined direction, the color map containing color information for each pixel;
a normal map creation unit configured to analyze the measured images according to the photometric stereo method and to create a normal map representing normal vectors of the object in association with each pixel contained within the image;
a height map creation unit configured to create a height map representing the respective height of the object in association with each of the pixels, by scanning the entirety of the normal map in a predefined direction and by integrating the inclination of the object identified in the predefined direction by referring to the respective normal vectors; and
a storage unit configured to store the color map, the normal map, and the height map as the image data.

9. The image data generation device according to claim 8, wherein:
the color map creation unit generates hierarchical data for a color map in which a plurality of color maps of different resolutions generated from reducing the measured image are hierarchized in order of resolution,
the height map creation unit uses the normal map created by the normal map creation unit corresponding to the resolution of the measured image so as to generate a height map of the same resolution, and creates hierarchical data for a height map in which a plurality of height maps of different resolutions generated by reducing the generated height map are hierarchized in order of resolution, and
of the height maps of the respective layers in the hierarchical data for the height map, the normal map creation unit: scans the entirety of height maps for layers other than the layer corresponding to the resolution of the measured image in a plurality of directions; differentiates a height of the object so as to acquire information on the inclination of the object in respective scan directions; and computes a synthesized normal vector produced by synthesizing, for each pixel, normal vectors identified in respective scan directions from the inclination, thereby creating hierarchical data for the normal map in which a plurality of normal maps of different resolutions are hierarchized in order of resolution.

10. The image data generation device according to claim 8, wherein the height map creation unit creates an ultimate height map by scanning the entirety of the normal map a plurality of times and in different scan directions and by averaging a plurality of height maps acquired for respective scan directions.

11. The image data generation device according to claim 8, further comprising:
a horizon map creation unit configured to create a horizon map by using the height map, the horizon map representing, for each pixel, information on a direction of a light source when a shadow of the object is cast on the pixel,
wherein the storage unit further stores the horizon map as the image data.

12. The image data generation device according to claim 9, further comprising:
a horizon map creation unit configured to generate hierarchical data for a horizon map in which a plurality of horizon maps of different resolutions are hierarchized in order of resolution, by using the height maps of the respective layers in the hierarchical data to generate, for the respective layers, horizon maps representing, for each pixel, information on a direction of a light source when a shadow of the object is cast on the pixel,
wherein the storage unit further stores the horizon map as the image data.

13. The image data generation device according to claim 8, wherein:
the measured image acquisition unit generates, for each direction of light sources, hierarchical data for a measured image in which a plurality of images of different resolutions produced by reducing each of measured images captured with each light source, and
the normal map creation unit creates hierarchical data in which a plurality of normal maps of different resolutions are hierarchized in order of resolution, by analyzing measured image data in each layer in the hierarchical data for the measured image and creating normal maps corresponding to the respective layers.

14. An image processing method comprising:
identifying frame coordinates of an area that is located in an image to be displayed and that is to be newly displayed in response to a request input by a user to move a viewpoint;
reading at least one of a plurality of items of image data stored in a storage device and respectively used for a plurality of processes for rendering an image to be displayed, and using the read data to render an area in a displayed image corresponding to the frame coordinates; and
outputting data for the rendered area to a display device,
wherein the rendering comprises determining which of one or more processes to perform among the plurality of processes that respectively use the plurality of items of image data, depending on the height of a viewpoint responsive to the request to move the viewpoint.

15. An image data generation method for generating data for an image capturing an object, comprising:
acquiring a plurality of measured images capturing the object in different directions of a light source and storing the images in a memory;

creating a color map from one of the measured images read from the memory and captured when the light source is in a predefined direction, the color map containing color information for each pixel;

analyzing the measured image read from the memory according to the photometric stereo method and creating a normal map representing normal vectors of the object in association with each pixel contained within the image;

creating a height map representing the respective height of the object in association with each of the pixels, by scanning the entirety of the normal map in a predefined direction and by integrating the inclination of the object identified in the predefined direction by referring to the respective normal vectors; and storing the color map, the normal map, and the height map in a storage device as the image data.

16. A computer program embedded on a non-transitory computer-readable recording medium, comprising:

a module configured to identify frame coordinates of an area that is located in an image to be displayed and that it to be newly displayed in response to a request input by a user to move a viewpoint;

a module configured to read at least one of a plurality of items of image data stored in a storage device and respectively used for a plurality of processes for rendering an image to be displayed, and use the read data to render an area in a displayed image corresponding to the frame coordinates; and a module configured to output data for the rendered displayed image to a display device, wherein the module for rendering determines which of one or more processes to perform among the plurality of processes that respectively use the plurality of items of image data, depending on the height of a viewpoint responsive to the request to move the viewpoint.

17. A computer program embedded on a non-transitory computer-readable recording medium to implement on a computer a function of generating data for an image capturing an object, comprising:

a module acquiring a plurality of measured images capturing the object in different directions of a light source and storing the images in a memory;

a module configured to create a color map from one of the measured images read from the memory and captured when the light source is in a predefined direction, the color map containing color information for each pixel;

a module configured to analyze the measured image read from the memory according to the photometric stereo method and create a normal map representing normal vectors of the object in association with each pixel contained within the image;

a module configured to create a height map representing the respective height of the object in association with each of the pixels, by scanning the entirety of the normal map in a predefined direction and by integrating the inclination of the object identified in the predefined direction by referring to the respective normal vectors; and a module configured to store the color map, the normal map, and the height map in a storage device as the image data.

18. A non-transitory computer-readable recording medium having embodied thereon a computer program comprising:

a module configured to identify frame coordinates of an area that is located in an image to be displayed and that is to be newly displayed in response to a request input by a user to move a viewpoint;

a module configured to read at least one of a plurality of items of image data stored in a storage device and respectively used for a plurality of processes for rendering an image to be displayed, and use the read data to render an area in a displayed image corresponding to the frame coordinates; and a module configured to output data for the rendered displayed image to a display device, wherein the module for rendering determines which of one or more processes to perform among the plurality of processes that respectively use the plurality of items of image data, depending on the height of a viewpoint responsive to the request to move the viewpoint.

19. A non-transitory computer-readable recording medium having embodied thereon a computer program for implementing on a computer a function of generating data for an image capturing an object, the computer program comprising:

a module acquiring a plurality of measured images capturing the object in different directions of a light source and storing the images in a memory;

a module configured to create a color map from one of the measured images read from the memory and captured when the light source is in a predefined direction, the color map containing color information for each pixel;

a module configured to analyze the measured image read from the memory according to the photometric stereo method and create a normal map representing normal vectors of the object in association with each pixel contained within the image;

a module configured to create a height map representing the respective height of the object in association with each of the pixels, by scanning the entirety of the normal map in a predefined direction and by integrating the inclination of the object identified in the predefined direction by referring to the respective normal vectors; and a module configured to store the color map, the normal map, and the height map in a storage device as the image data.

20. A data structure of an image file read from a storage device to display at least a part of an image on a display, the data structure mapping the following to each other:

a color map used to represent a color in a displayed image and maintaining color information for each pixel;

a height map used to represent parallax relative to an object in an image and maintaining, for each pixel, information on the height of the object, respectively, relative to an image plane;

a normal map used to represent surface roughness of an object in an image and maintaining, for each pixel, information on a normal vector on the surface of the object; and a horizon map used to cast a shadow corresponding to a light source of a predefined direction and maintaining, for each pixel, information on a direction of a light source when a shadow of an object is cast on the pixel.

21. The data structure of an image file according to claim 20, wherein the color map, the height map, the normal map, and the horizon map have a hierarchical structure in which data corresponding to image data at different resolutions for different representations of a single image are hierarchized in order of resolution.

* * * * *